May 31, 1955 W. P. LANGSDORF, JR., ET AL 2,709,709
PYRUVALDOXIME SYNTHESIS
Filed July 9, 1953 2 Sheets-Sheet 1
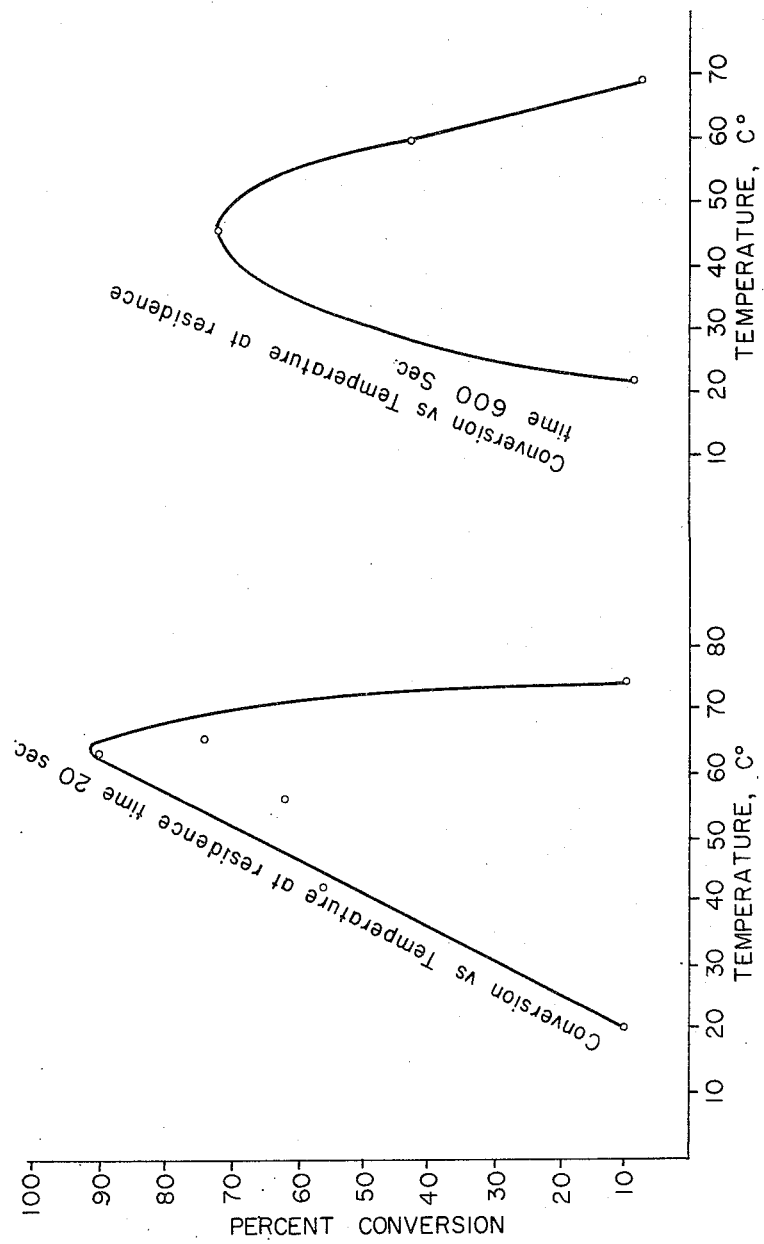
FIG. 1. Correlated effect of temperature and contact time on conversion of acetone and methyl nitrite to pyruvaldoxime by continuous flow method.
INVENTOR
WILLIAM P. LANGSDORF, JR.
MARCUS A. NAYLOR, JR.
BY G. McAlevy
ATTORNEY

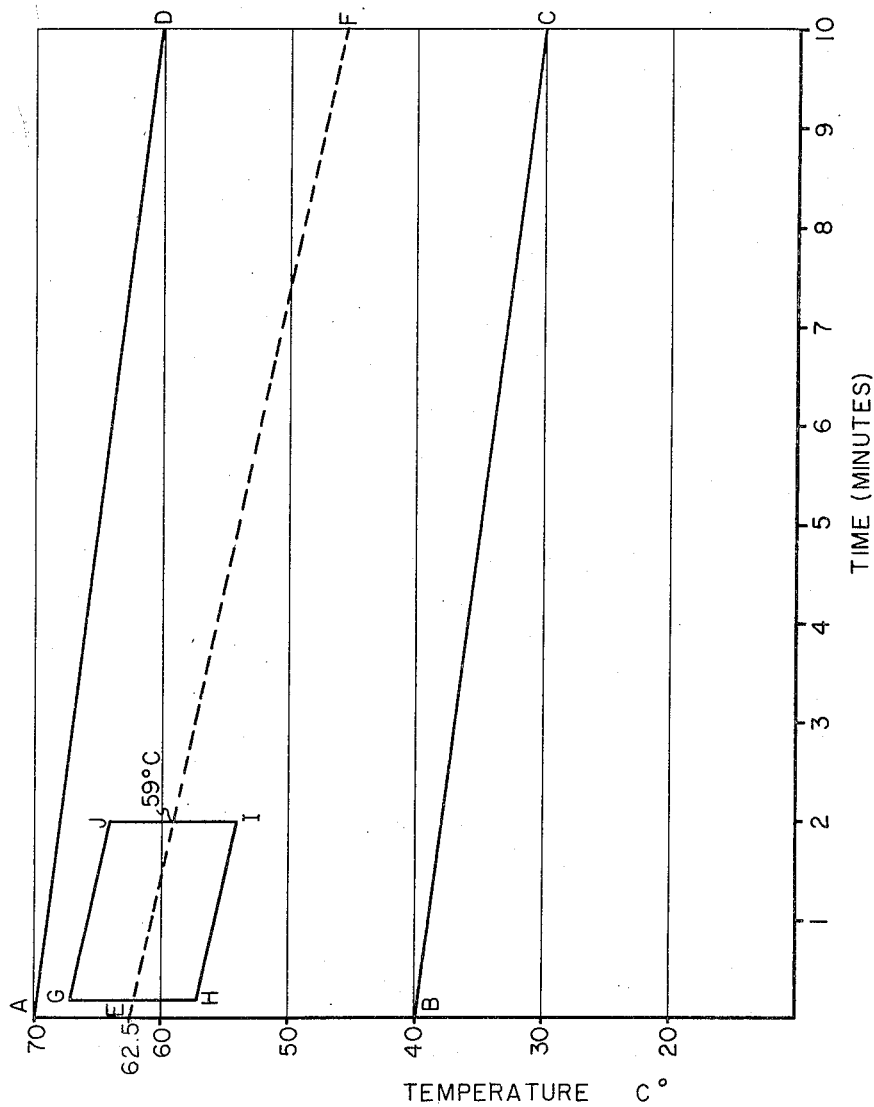

United States Patent Office 2,709,709
Patented May 31, 1955

2,709,709

PYRUVALDOXIME SYNTHESIS

William P. Langsdorf, Jr., and Marcus A. Naylor, Jr., Wilmington, Del., assignors to E. I. du Pont de Nemours and Company, Wilmington, Del., a corporation of Delaware Application July 9, 1953, Serial No. 367,067

5 Claims. (Cl. 260—566)

This invention relates to the preparation of pyruvaldoxime by reaction between acetone and methyl nitrite.

It has been known for many years that pyruvaldoxime can be prepared by reaction of acetone with methyl nitrite. It has also been known that the yields in this reaction are very variable and unpredictable. In fact, it has even been reported that under some of the conditions which had been disclosed for carrying out this reaction, negative results have later been obtained (Claisen, Ber. 20, 252 (1887); Sandmeyer, Ber. 20, 639 (1887); Slater, J. Chem. Soc. 117, 587 (1920); Kuster, Zeit. für Physiol. Chem. 155, 175 (1926); Freon, Ann. Chim. 11, 459 (1939).

Pyruvaldoxime at the present time is of interest as a source of 2,5-dimethylpiperazine which can be used as a nylon intermediate. It has become important therefore to learn how to control the nitrosation of acetone so as to produce pyruvaldoxime in consistently good yields.

It has been discovered, according to this invention, that the formation of pyruvaldoxime from acetone and methyl nitrite takes place in consistently high yields under narrowly controlled reaction conditions, the range of temperatures for obtaining substantial yields being remarkably narrow, said range of temperature being different at various reaction times. These variables, which were not heretofore known to be critical and interdependent, are readily controllable by the use of a continuous flow system. The sensitiveness of the reaction to temperature and reaction time, as co-related variables, in all probability accounts for the variability in the results heretofore reported in batch systems for converting acetone and methyl nitrite to pyruvaldoxime. In this connection, it is noteworthy that as the temperature is increased only slightly above the optimum value, the conversion to pyruvaldoxime drops to nullity or to a very low value. The invention can be practiced by carrying out the reaction at temperatures of about 30° to 72° C., followed by chilling the resulting mixture or otherwise stopping the reaction, when the reaction has proceeded for such a period of time within the range of 10 seconds to 10 minutes that pyruvaldoxime is formed as the chief reaction product. This is shown in the accompanying drawing which illustrates graphically the effect of temperature on conversion. The optimum temperature is about 60° to 65° C. when the length of time the reactants are exposed to that temperature is 20 to 30 seconds, and is about 45° to 50° C. when the time of exposure is 8 to 10 minutes. These graphs also show that at a temperature of 70° C. the conversion is 70 to 90% at a contact time of 20 seconds, falling to 10% at 73° C., and that conversion at 70° C. drops to 10% as the contact time is increased to 10 minutes (Fig. 1). In Fig. 2, the area ABCD corresponds with the conditions of highest yield, the best yield, at the reaction times specified, being along the line EF. Yields which are optimum, and surprisingly high, are reproducibly obtained by means of a continuous flow process wherein reaction time is not more than two minutes (the minimum time being governed by mechanical considerations, such as rate of heat transfer) and the temperature is held at within 5° of the temperature defined by the line EF of Fig. 2 (area GHIJ).

In batchwise operation, especially on a relatively large scale, it is extremely difficult or impossible to control temperature and residence time at the optimum levels indicated by the drawing. If the rate of heat input is too slow, the bath or other heating medium remains too long in a temperature range at which the yield is poor. The same adverse effect is produced when one reactant is added gradually to the other which is being maintained at a fixed temperature, unless fortuitously the temperature is within the narrow range which corresponds with the particular rate of introduction of the added reactant. These difficulties, which affect batchwise operation, are eliminated by the use of a continuous flow system.

Thus, it has been found, according to this invention, that reliable and completely reproducible results are achieved by passing acetone and methyl nitrite into a reaction zone, and controlling the contact time and temperature of the reaction mixture in the said zone within the range of 10 seconds to 10 minutes while keeping the temperature between 30 and 72° C., said temperature, however, being controlled for maximum yields at $\pm 15°$ of a temperature defined by the expression: 55° C. minus one degree for each minute of reaction time. It is desirable, but not essential, to preheat the reactants separately or to mix them at a temperature below about 10° C., and bring them to the initial reaction temperature as quickly as possible. This initial temperature may be slightly above the optimum reaction temperature, for this frequently facilitates the use of short reaction times by making it possible to hold the temperature more readily within the optimum range (under conditions of lowering temperature), during most of the total reaction time. In any event, some means must be provided for balancing the temperature against the reaction time, within the limits just set forth.

It is to be understood that the pressure may be varied rather widely, provided of course, the pressure is sufficient to keep the reaction mixture in the liquid phase (i. e. to keep the normally gaseous methyl nitrite dissolved in acetone) at the prevailing temperature. The pressure need not exceed a few atmospheres, e. g. 1.5 to 5 atmospheres, but higher pressures may be of course employed if desired. No solvent is necessary or desirable, but it is helpful to employ an excess of the acetone reactant. The mol ratio of acetone to methyl nitrite may vary widely, for example, from 2:1 to 20:1; the relationship between temperature, contact time, and conversion is not materially affected by variations in the acetone:methyl nitrite ratio, and relative quantities of these reactants outside the range stated above also give rather satisfactory results.

In the experiments reported in the drawing the mol ratio of acetone:methyl nitrite was 8:1.

When the initial mol ratio of acetone:methyl nitrite is relatively low, there is sometimes a certain amount of difficulty in controlling the rate of flow of the reaction mixture. This is partly due to the fact that pyruvaldoxime can separate as a solid, the melting point of pure pyruvaldoxime being 63–64° C. It is accordingly desirable to employ enough acetone to keep the mixture in the form of an essentially homogeneous liquid under the reaction conditions.

It is essential to employ an acidic catalyst, such as a small amount of an aqueous mineral acid. For example, a quantity of concentrated hydrochloric acid equal to .01 to 1.0% (0.2 to 0.3% was used in the comparative experiments upon which the data in the drawing were based) of the weight of the reaction mixture is sufficient for initiating or catalyzing a rapid nitrosation reaction. Solid acidic catalysts, such as acid-treated clays, etc., may be employed if desired.

The invention is illustrated further by means of the following examples.

*Example 1.*—A mixture containing 84.4 grams of acetone, 11 grams of methyl nitrite, and 0.28 milliliter concentrated HCl was placed in a glass reservoir held at 0° to −1° C. by circulation of a cold water-methanol solution. This mixture was continuously fed under a superatmospheric pressure of 26 pounds/sq. in. into a glass reactor heated to 70° C. by a circulating water bath. The temperature of the emerging mixture was 65° to 66° C. Residence time in the heated zone was held at 18 seconds. The mixture was then passed through a cold zone maintained at 0° to −1° C. and thence, at atmospheric pressure, to glass traps cooled in Dry Ice. Volume of the cold zone was approximately equal to that of the reaction zone. Excess reactants were recovered by distillation of the cold trap contents at 160–170 mm.; final removal of volatile components from the mixture was accomplished at 10–15 mm. From this experiment 12 grams of pyruvaldoxime was obtained, and 2 grams of methyl nitrite was recovered. Conversion of methyl nitrite to pyruvaldoxime was 82% and conversion of acetone was 10%. The yield of oxime, based on unrecovered methyl nitrite, was 94%.

*Example 2.*—A mixture containing 129.3 grams of acetone, 17 grams of methyl nitrite, and 0.5 milliliter of concentrated HCl was placed in a glass reservoir held at 0° C. by circulation of ice water. This mixture was continuously fed under a superatmospheric pressure of 30 pounds/sq. in. into a glass reactor heated to 63° C. by a circulating water bath. The temperature of the emerging mixture was 56–58° C. Residence time in the reactor was held at 18 to 22 seconds. The mixture was then passed through a cold zone maintained at 0° C. and thence into a flask which was kept under vacuum by a Cenco "Megavac" pump. Pressure in the flask was 40–55 mm. Volatile portions of the reaction mixture were collected in glass traps cooled in Dry Ice and in liquid nitrogen. Final drying of the product was accomplished at 5 mm. From this experiment 24.3 grams of solid oxime, M. P. 56 to 57° C. was obtained; only a trace of methyl nitrite was recovered. Conversion of methyl nitrite and yield of pyruvaldoxime was quantitative. Conversion of acetone was 12.5%.

It is to be understood that the foregoing examples are illustrative only and that numerous embodiments of the present invention will occur to those who are skilled in the art. For example, the reaction vessel may be made of or lined with any suitable non-corrosive material of construction, such as glass, quartz, inert metals, and the like. It is essential to sepaarte the product from the reaction mixture as rapidly as possible.

As hereinabove mentioned and as illustrated in the examples, it is frequently preferred, for practical reasons, to use a bath temperature somewhat above the optimum in order to bring the cold reactants rapidly to the optimum reaction temperature (suitably within the range embraced by GHIJ of Figure 2, the line GH corresponding to a reaction time of 10 seconds), the temperature at the end of the reaction period being sometimes slightly below this optimum level depending on the heat balance characteristics of the equipment. Quantitative yields at conversions exceeding 80% (based on methyl nitrite) can be achieved in this manner.

The process of the present invention is useful in that it provides a greatly improved method for the synthesis of pyruvaldoxime which in turn is readily convertible to 2,5-dimethylpiperazine by hydrogenation in the known manner.

We claim:

1. A process for preparing pyruvaldoxime by reaction between acetone and methyl nitrite which comprises carrying out the said reaction in a continuous flow system under sufficient pressure to maintain the reactants in the liquid phase in the presence of an added mineral acid catalyst, the mol ratio of acetone to methyl nitrite introduced being from 2:1 to 20:1, maintaining the temperature in the reaction zone between 30° and 72° C. while limiting the residence time therein to not more than 10 seconds at 72° C. to not more than 10 minutes at 30° C. and thereafter separating pyruvaldoxime from the resulting mixture.

2. Process of claim 1 wherein the temperature and reaction time are so controlled that the temperature is ±15° of a temperature defined by the expression: 55° C. minus one degree per each minute of reaction time.

3. Process of claim 2 wherein the mol ratio of acetone to methyl nitrite is initially from 2:1 to 20:1.

4. Process of claim 2 wherein the acidic catalyst is hydrochloric acid.

5. A process for preparing pyruvaldoxime by reaction between acetone and methyl nitrite which comprises carrying out the said reaction in a continuous flow system under sufficient pressure to maintain the reactants in the liquid phase in the presence of an added mineral acid catalyst, the mol ratio of acetone to methyl nitrite introduced being from 2:1 to 20:1, maintaining the temperature in the reaction zone between 30° and 72° C. while limiting the residence time therein to not more than 10 seconds at 72° C. and not more than 10 minutes at 30° C. and thereafter separating pyruvaldoxime from the resulting mixture.

No references cited.